United States Patent
Wang et al.

(10) Patent No.: US 12,195,618 B2
(45) Date of Patent: Jan. 14, 2025

(54) 3D PRINTABLE RESIN COMPOSITIONS

(71) Applicant: AGENCY FOR SCIENCE, TECHNOLOGY AND RESEARCH, Singapore (SG)

(72) Inventors: FuKe Wang, Singapore (SG); Yi Ting Chong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 196 days.

(21) Appl. No.: 17/802,669

(22) PCT Filed: Feb. 26, 2021

(86) PCT No.: PCT/SG2021/050097
§ 371 (c)(1),
(2) Date: Aug. 26, 2022

(87) PCT Pub. No.: WO2021/173084
PCT Pub. Date: Sep. 2, 2021

(65) Prior Publication Data
US 2023/0122021 A1    Apr. 20, 2023

(30) Foreign Application Priority Data
Feb. 27, 2020   (SG) .................. 10202001784W

(51) Int. Cl.
*B33Y 70/00*   (2020.01)
*C08L 33/10*   (2006.01)
(Continued)

(52) U.S. Cl.
CPC .............. *C08L 33/10* (2013.01); *B33Y 70/00* (2014.12); *B29C 64/124* (2017.08);
(Continued)

(58) Field of Classification Search
CPC .. C08F 222/1025; C08F 220/286; C08F 2/50; B33Y 70/00; B33Y 10/00; C08L 33/10;
(Continued)

(56) References Cited

U.S. PATENT DOCUMENTS

2003/0153964 A1\*  8/2003  Al-Lamee ............ A61N 1/0496
                                                                  607/115
2018/0361660 A1   12/2018  Chen et al.

FOREIGN PATENT DOCUMENTS

| WO | WO-2018/165090 A1 | 9/2018 |
| WO | WO-2019/006409 A1 | 1/2019 |
| WO | WO-2020/014871 A1 | 1/2020 |

OTHER PUBLICATIONS

Goswami et al., "Thermal Degradation Kinetics of Poly(trimethylol propane triacrylate)/poly(hexane diol diacrylate) Interpenetrating Polymer Network", Thermochimica Acta, vol. 547, Aug. 16, 2012, pp. 53-61.

(Continued)

*Primary Examiner* — Monica A Huson
(74) *Attorney, Agent, or Firm* — MARSHALL, GERSTEIN & BORUN LLP

(57) ABSTRACT

This invention relates to a resin composition comprising at least one of a first monomeric or oligomeric component (A), at least one of a second monomeric or oligomeric component (B) and a photoinitiator. This invention also relates to a method of preparing a polymer from the resin composition, a polymer prepared from the resin composition, a method of forming a 3-dimensional printed article, and a kit comprising at least one of a first monomeric or oligomeric component (A), at least one of a second monomeric or oligomeric component (B) and a photoinitiator.

19 Claims, 3 Drawing Sheets

(51) Int. Cl.
  *B29C 64/124* (2017.01)
  *B29K 33/00* (2006.01)
  *B29K 105/00* (2006.01)
  *B33Y 10/00* (2015.01)

(52) U.S. Cl.
  CPC .. *B29K 2033/12* (2013.01); *B29K 2105/0002* (2013.01); *B33Y 10/00* (2014.12)

(58) Field of Classification Search
  CPC .............. B29C 64/124; B29K 2033/12; B29K 2105/0002
  See application file for complete search history.

(56) References Cited

OTHER PUBLICATIONS

Weigand et al., "3D Printing of Dual-cure Benzoxazine Networks", Polymer, vol. 189, Jan. 21, 2020, 8 pages.
Zhang et al., "Reprocessable Thermosets for Sustainable Three-dimensional Printing", Nature Communications, vol. 9, May 8, 2018, 7 pages.
Search Report and Written Opinion in International Application No. PCT/SG2021/050097 dated Apr. 21, 2021, 14 pages.

* cited by examiner

[Fig. 1]
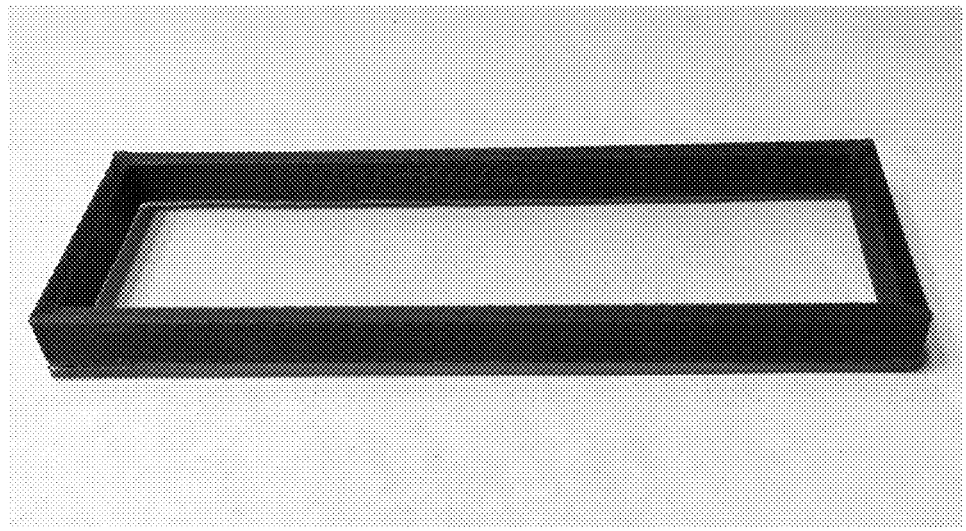
[Fig. 2]
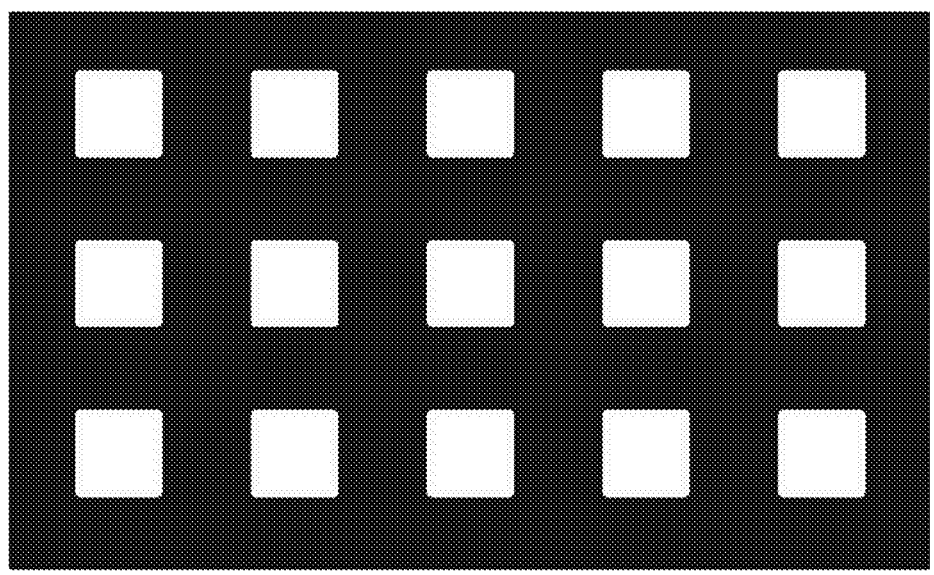

[Fig. 3]
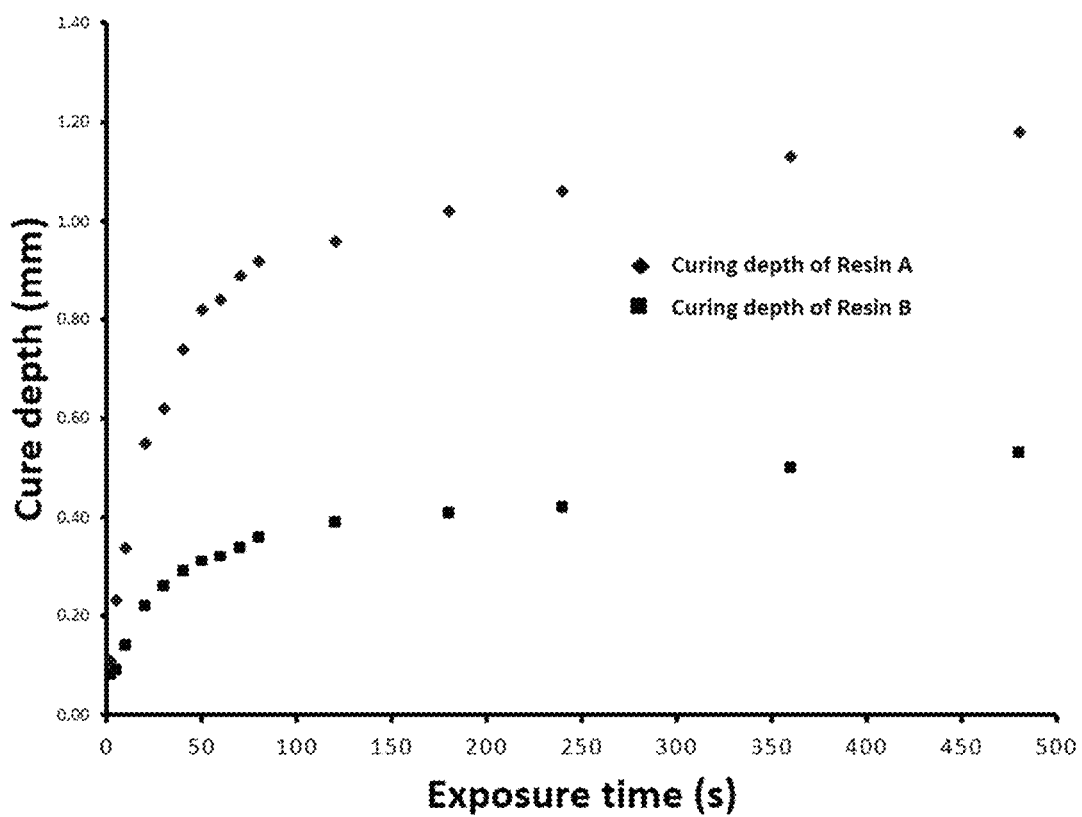

[Fig. 4]
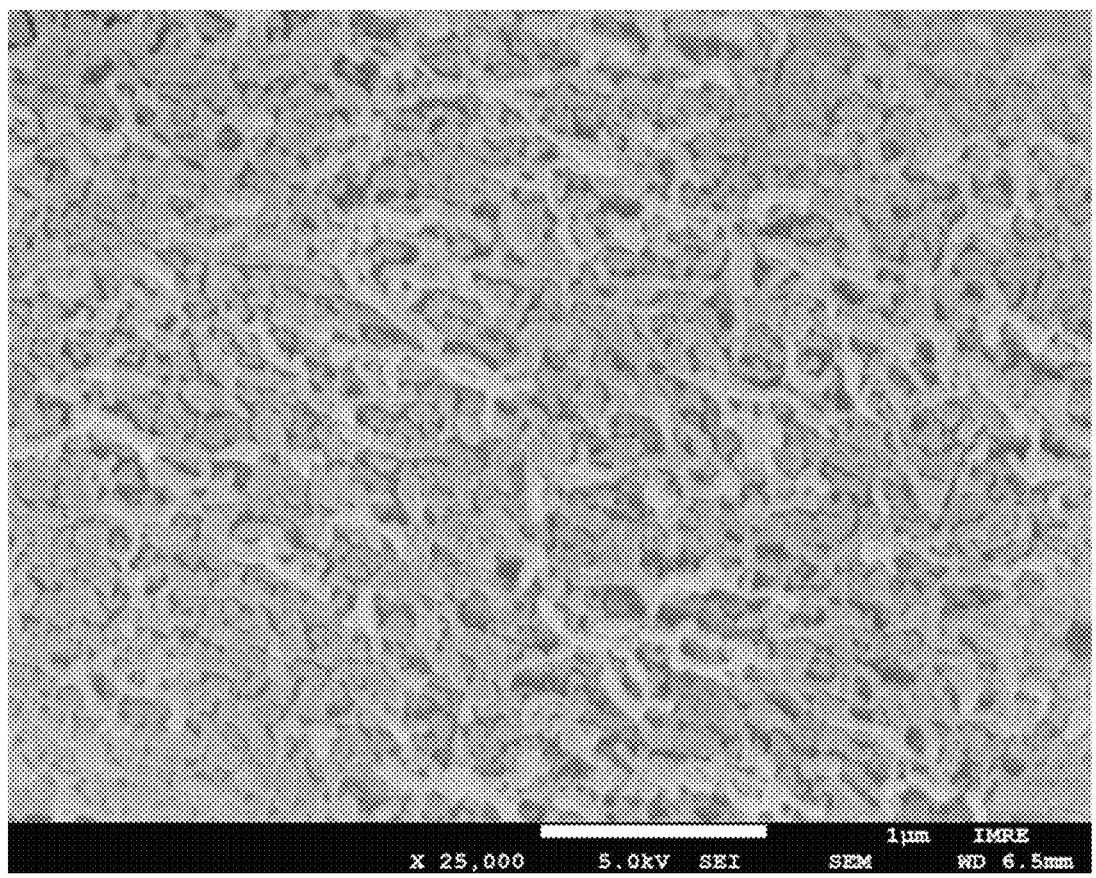

3D PRINTABLE RESIN COMPOSITIONS

REFERENCES TO RELATED APPLICATIONS

This application claims priority to Singapore application number 10202001784W filed on 27 Feb. 2020, the disclosure of which is hereby incorporated by reference.

TECHNICAL FIELD

The present invention generally relates to a resin composition with at least two different monomeric or oligomeric components and a photoinitiator. The present invention also relates to a method of preparing a polymer from the resin composition, a method of forming a 3-dimensional printed article, a polymer prepared from the resin composition, which displays superior mechanical properties, and a kit comprising the components of the resin composition.

BACKGROUND ART

Additive manufacturing (AM), which is more colloquially referred to as 3-dimensional or 3D printing, is quickly approaching mainstream adoption as a highly flexible processing technique that can be applied to plastic, metal, ceramic, concrete and other building materials for manufacturing of complex structures without tedious processing and specialized tooling. If required production is limited to small scales, parts can be obtained easily, with limited scrap production and energy consumption and without the need for expensive tools or elaborate assembly. Various applications of 3D printing in electronics, medical devices, automobile and aerospace industry, construction, and architecture have been developed. Many different 3D printing technologies such as digital light processing (DLP), stereolithography (SLA), fused deposition modelling (FDM), selective laser sintering (SLS), selective laser melting (SLM) and so on, have been developed for different materials and applications. The last decade has witnessed a significant growth in the 3D printing industry, and 3D printing plastic is the most promising market. It was valued at USD 494.1 million in 2017 and is projected to reach USD 1,965.3 million by 2023, at a CAGR of 26.1% during the forecast period.

Despite the many advantages of 3D printing technologies, there are limitations intrinsically linked to these new technologies. Perhaps the biggest issue, though, is the mechanical properties of the final products, which are generally lower when compared with those of similarly shaped objects obtained through standard processing methods (such as injection molding). These include the inevitable presence of voids, the printed objects being anisotropic and highly dependent on processing parameters, and intrinsic low mechanical performance of the printable materials. There have been attempts to enhance the mechanical performance of such 3D printed products by adding carbon-fiber reinforced plastics (CFRP) to a 3D-printable resin composition before 3D printing. The carbon-fiber is used to enhance the corresponding strengths and moduli of the printed product, while the resin bonds the carbon-fiber and uniformly distribute and transfer the external load. Both short carbon-fibers and continuous carbon-fiber reinforcements have been developed for 3D printing technologies. However, the low inter-laminar shear strength of the printed structures limit their applications in engineering products where isotropic reinforcement is required.

3D photopolymerization based techniques such as stereolithography (SLA), digital light processing (DLP) and continuous liquid interface production (CLIP) can help to eliminate the anisotropic mechanical problem as these technologies are based on using monomers or oligomers in a liquid state that can be cured or photopolymerized upon exposure to light source of specific wavelength and form thermosets. A photoinitiator or photoinitiator system is required to convert photolytic energy into the reactive species, a radical or cation, which can drive the chain growth via radical or cationic mechanism. Various photocurable formulations have been used in a 3D printing process, offering different chemical and mechanical properties. Although developed systems show great promise in 3D applications, they cannot fulfil all the desired requirements of the final products, particularly for engineering applicators due to the poor mechanical performance.

There is a need to provide a resin composition suitable for 3D printing that overcomes, or at least ameliorates, one or more of the disadvantages described above. Specifically, there is a need to provide a resin composition which upon 3D printing provides a product with enhanced mechanical performance.

SUMMARY

According to a first aspect, there is provided a resin composition comprising at least one first monomeric or oligomeric component (A), at least one second monomeric or oligomeric component (B) and a photoinitiator,
wherein
the first monomeric or oligomeric component (A) has a formula $[(A_1)\text{-}(A_2)_b]_a\text{-}[(A_3)]_e$, wherein
$A_1$ is independently selected from an acrylate moiety or a methacrylate moiety,
$A_2$ is independently selected from the group consisting of a linear alkyl, a linear alkoxy ether and a linear poly(alkoxy ether) moiety, said linear alkyl, said linear alkoxy ether or said linear poly(alkoxy ether) moiety being optionally substituted by at least one hydroxyl substituent,
a is an integer selected from at least 2,
b is an integer selected from either 0 or at least 1,
e is an integer selected from at least 1, and
if a is 2, $A_3$ is selected from the group consisting of an aryl, a biaryl, a tricyclic alkyl and a urethane moiety, or
if a is 3 or more, $A_3$ is selected from the group consisting of an alkoxy ether, a saturated heterocycle or an alkyl moiety, and
the second monomeric or oligomeric component (B) has a formula $(B_1)_c\text{-}(B_2)_d$, wherein
$B_1$ is independently selected from an acrylate moiety or a methacrylate moiety,
$B_2$ is selected from the group consisting of an alkyl, an alkoxy ether, a thioalkyl, an aryl, an amino and a poly(alkoxy ether) moiety,
c is an integer selected from 1 or 2, and
d is an integer selected from at least 1.

In another aspect, there is a polymer blend obtainable by the method disclosed herein, wherein the polymer blend comprises a first polymer, resulting from polymerization of the first monomeric or oligomeric component (A) of the resin composition disclosed herein, and a second polymer, resulting from polymerization of the second monomeric or oligomeric component (B) of the resin composition disclosed herein, interpenetrated with the first polymer.

The polymer blend may also be termed as an interpenetrating polymer network (IPN) where the second polymer formed from the second monomeric or oligomeric component (B) interpenetrates into the polymer network formed from the first monomeric or oligomeric component (A).

Advantageously, the functional groups in the first monomeric or oligomeric component (A) of the resin composition disclosed herein have a higher reactivity than the functional groups in the second monomeric or oligomeric component (B), which results in the first monomeric or oligomeric component (A) polymerizing faster than the second monomeric or oligomeric component (B) upon exposure of the resin composition to light. This sequential polymerization process leads to the first monomeric or oligomeric component (A) building a hard and cross-linked three-dimensional network, which is interpenetrated by the polymer resulting from polymerization of the second monomeric or oligomeric component (B) to form a ductile and tougher polymer matrix.

Advantageously, the proportion of the first monomeric or oligomeric component (A) and second monomeric or oligomeric component (B) may be adjusted to tune the strength and/or flexibility of the resulting interpenetrated polymer. By increasing the amount of first monomeric or oligomeric component (A), a tougher polymer may be obtained while increasing the amount of second monomeric or oligomeric component (B), a more flexible polymer may be obtained.

In the polymer blend, the first polymer can be regarded as a "rigid" polymer and the second polymer can be regarded as a "flexible" polymer whereby the second polymer interpenetrates into the first polymer. By having the second polymer interpenetrated with the first polymer, advantageously, this can strengthen the polymer by the spontaneous integration of the hard and soft regions in the resulting polymer matrix to result in a polymer showing a higher mechanical performance, which is much better than the mechanical properties of the individual polymer components. It is unexpected that the mechanical property of the polymer is better than that of the individual polymer components, as typically, when two polymer components are combined to form a new polymer, the mechanical property of the new polymer is typically influenced by the polymer component that has a lower mechanical property such that the mechanical property of the new polymer is lower than that of the polymer component with the lower mechanical property, as a result of immiscibility and poor interface interaction. In the present application, the inventors have surprisingly and unexpectedly found that the present polymer has a mechanical property that is actually higher than that of the polymer component with a lower mechanical property and is also higher than that of the polymer component with the higher mechanical property. This unexpected improvement in the mechanical property can be due to the sequential polymerization that controls the polymer networking formation leading to the strong interaction between the polymer components.

Advantageously, the polymer may display higher mechanical strength than that of market benchmark polymers such as RenShape®SL 7820, which possesses a tensile modulus of 2.0 to 2.5 GPa as a result of the polymer network of a hard and cross-linked three-dimensional network comprising component (A) interpenetrated by the polymer resulting from polymerization of the second monomeric or oligomeric component (B).

In another aspect, there is provided a method of preparing a polymer from the resin composition disclosed herein comprising the steps of (i) polymerizing the resin composition disclosed herein with light, and (ii) curing the polymer from step (i) with ultraviolet radiation. Advantageously, the polymer may be prepared by simply exposing the resin composition to light at room temperature, as both the monomeric or oligomeric components of the resin composition are polymerizable by light. Advantageously, polymerization of the resin composition may result in a polymer with isotropic mechanical properties.

Advantageously, the method of preparing a polymer from the resin composition disclosed herein results in spontaneous polymerization of the first monomeric or oligomeric component (A) followed by the second monomeric or oligomeric component (B) without the need for external control of the curing process for each component. Further advantageously, polymerization of the first monomeric or oligomeric component (A) does not result in aggregation or separation of the solid and liquid phases of the second monomeric or oligomeric component (B), thereby improving the interface interaction between the two components (A) and (B) and interpenetration of the two components (A) and (B) in the resulting polymer. The inventors have unexpectedly and surprisingly found that the method disclosed herein results in a fine polymer network with better interpenetration of the two components (A) and (B). This unexpected effect may be due to the polymerization of the second monomeric or oligomeric component (B) occurring immediately after or during the polymerization of the first monomeric or oligomeric component (A), such that there is no serious phase separation between the polymerized first monomeric or oligomeric component (A) and the unpolymerized second monomeric or oligomeric component (B) or assembly of the unpolymerized second monomeric or oligomeric component (B) into large liquid aggregates, thereby allowing for better interface interaction between components (A) and (B).

In another aspect, there is provided a method of forming a 3-dimensional printed article, comprising the steps of (i) polymerizing a resin composition described herein with light using a 3-dimensional printer, and (ii) curing the polymer from step (i) with ultraviolet radiation.

In another aspect, there is provided a kit comprising:
(i) at least one first monomeric or oligomeric component (A),
(ii) at least one second monomeric or oligomeric component (B), and
(iii) a photoinitiator.

DEFINITIONS

The following words and terms used herein shall have the meaning indicated:

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

The term "alkyl" refers to a straight- or branched-chain alkyl group having from 1 to 12 carbon atoms in the chain. Exemplary alkyl groups include methyl (Me), ethyl (Et), n-propyl, isopropyl, butyl, isobutyl, sec-butyl, tert-butyl (tBu), pentyl, isopentyl, tert-pentyl, hexyl, isohexyl, and the like.

The term "alkoxy" as used herein refers to straight chain or branched alkyloxy groups. Examples include methoxy, ethoxy, n-propoxy, isopropoxy, tert-butoxy, and the like.

The term "aromatic group", or variants such as "aryl" or "arylene" as used herein refers to monovalent ("aryl") and divalent ("arylene") single, polynuclear, conjugated and fused residues of aromatic hydrocarbons having from 6 to 10 carbon atoms. Examples of such groups include phenyl, biphenyl, naphthyl, phenanthrenyl, and the like.

The term "substituted" as used herein refers to the specified group or moiety bearing one or more substituents.

The term "optionally substituted" as used herein refers to the specified group being unsubstituted or substituted by one or more substituents.

The term "interpenetrating polymer network" as used herein refers to a macromolecular assembly comprising two or more polymers wherein at least one is in the form of a network, there is partial interlacing between the polymers on a molecular scale but no covalent bonds between the polymers.

DETAILED DISCLOSURE OF EMBODIMENTS

Exemplary, non-limiting embodiments of a resin composition, will now be disclosed.

There is provided a resin composition comprising at least one first monomeric or oligomeric component (A), at least one second monomeric or oligomeric component (B) and a photoinitiator,
wherein
the first monomeric or oligomeric component (A) has a formula $[(A_1)\text{-}(A_2)_b]_a\text{-}[(A_3)]_e$, wherein
$A_1$ is independently selected from an acrylate moiety or a methacrylate moiety,
$A_2$ is independently selected from the group consisting of a linear alkyl, a linear alkoxy ether and a linear poly (alkoxy ether) moiety, said linear alkyl, said linear alkoxy ether or said linear poly(alkoxy ether) moiety being optionally substituted by at least one hydroxyl substituent,
a is an integer selected from at least 2,
b is an integer selected from either 0 or at least 1,
e is an integer selected from at least 1, and
if a is 2, $A_3$ is selected from the group consisting of an aryl, a biaryl, a tricyclic alkyl and a urethane moiety, or
if a is 3 or more, $A_3$ is selected from the group consisting of an alkoxy ether, a saturated heterocycle or an alkyl moiety, and
the second monomeric or oligomeric component (B) has a formula $(B_1)_c\text{-}(B_2)_d$, wherein
$B_1$ is independently selected from an acrylate moiety or a methacrylate moiety,
$B_2$ is selected from the group consisting of an alkyl, an alkoxy ether, a thioalkyl, an aryl, an amino and a poly(alkoxy ether) moiety,
c is an integer selected from 1 or 2, and
d is an integer selected from at least 1.

The resin composition is a photopolymerizable resin composition.

The first monomeric or oligomeric component (A) may have a percentage composition by weight in the range of 10 wt % to 60 wt %, based on the weight of the resin composition. The first monomeric or oligomeric component (A) may have a percentage composition by weight in the range of 10 wt % to 50 wt %, 10 wt % to 40 wt %, 10 wt % to 30 wt %, 10 wt % to 20 wt %, 20 wt % to 60 wt %, 20 wt % to 50 wt %, 20 wt % to 40 wt %, 20 wt % to 30 wt %, 30 wt % to 60 wt %, 30 wt % to 50 wt %, 30 wt % to 40 wt %, 40 wt % to 60 wt %, 40 wt % to 50 wt %, 50 wt % to 60 wt % or 30 wt % to 35 wt %, based on the weight of the resin composition.

The second monomeric or oligomeric component (B) may have a percentage composition by weight in the range of 20 wt % to 80 wt %, based on the weight of the resin composition. The second monomeric or oligomeric component (B) may have a percentage composition by weight in the range of 20 wt % to 70 wt %, 20 wt % to 50 wt %, 20 wt % to 30 wt %, 30 wt % to 80 wt %, 30 wt % to 70 wt %, 30 wt % to 50 wt %, 40 wt % to 80 wt %, 40 wt % to 70 wt %, 40 wt % to 50 wt %, 50 wt % to 80 wt %, 50 wt % to 70 wt %, 50 wt % to 60 wt %, 60 wt % to 80 wt %, 60 wt % to 70 wt %, 70 wt % to 80 wt % or 65 wt % to 70 wt %, based on the weight of the resin composition.

The photoinitiator may have a percentage composition by weight in the range of 0.1 wt % to 10 wt %. The photoinitiator may have a percentage composition by weight in the range of 0.1 wt % to 8 wt %, 0.1 wt % to 5 wt %, 0.1 wt % to 2 wt %, 0.1 wt % to 1 wt %, 0.5 wt % to 10 wt %, 0.5 wt % to 8 wt %, 0.5 wt % to 5 wt %, 0.5 wt % to 2 wt %, 0.5 wt % to 1 wt %, 0.7 wt % to 10 wt %, 0.7 wt % to 8 wt %, 0.7 wt % to 5 wt %, 0.7 wt % to 2 wt %, 0.7 wt % to 1 wt %, 1 wt % to 10 wt %, 1 wt % to 8 wt %, 1 wt % to 5 wt %, or 1 wt % to 2 wt %, based on the weight of the resin composition.

The first monomeric or oligomeric component (A) and the second monomeric or oligomeric component (B) may each have an average molar mass of between 100 to 1200 g/mol. The first monomeric or oligomeric component (A) and the second monomeric or oligomeric component (B) may each have an average molar mass of between 100 to 1200 g/mol, 300 to 1200 g/mol, 500 to 1200 g/mol, 100 to 1000 g/mol, 100 to 800 g/mol 100 to 600 g/mol, 300 to 1000 g/mol, or 500 to 800 g/mol.

The first monomeric or oligomeric component (A) may be selected from the group consisting of bisphenol A dimethacrylate (bis-DMA), bisphenol A diglycidyl ether methacrylate (bis-GMA), ethoxylated bisphenol-A dimethacrylate (bis-EMA), tricyclo[5.2.1.02,6]decanedimethanol diacrylate, bisphenol A glycerolate diacrylate, bisphenol A ethoxylate diacrylate, bisphenol A ethoxylate dimethacrylate (oligomer), bisphenol F ethoxylate diacrylate (oligomer), hydroquinone diacrylate, naphthalene-1,5-diyl diacrylate, tricyclodecane dimethanol diacrylate, urethane acrylate (oligomer), branched hexa-functional aliphatic urethane acrylate, di(trimethylolpropane) tetraacrylate, pentaerythritol triacrylate, 1,3,5-triacryloylhexahydro-1,3,5-triazine, trimethylolpropane propoxylate triacrylate, trimethylolpropane triacrylate, and trimethylolpropane trimethacrylate. The first monomeric or oligomeric component (A) may be bisphenol A dimethacrylate.

The second monomeric or oligomeric component (B), wherein d is 1 may be selected from the group consisting of ethyl acrylate, butyl acrylate, tert-butyl acrylate, ethyl 2-ethylacrylate, 2-(diethylamino)ethyl acrylate, 3-(dimethylamino)propyl acrylate, 2-carboxyethyl acrylate, 2-carboxyethyl acrylate oligomers, ethylene glycol methyl ether acrylate, ethyl 2-propylacrylate, hexyl acrylate, 4-hydroxybutyl acrylate, 2-hydroxyethyl acrylate, isodecyl acrylate, isooctyl acrylate, lauryl acrylate, methyl acrylate, methyl 3-hydroxy-2-methylenebutyrate, octadecyl acrylate, pentafluorophenyl acrylate, poly(propylene glycol) acrylate, tetrahydrofurfuryl acrylate, 2-tetrahydropyranyl acrylate, tert-butyl methacrylate, cyclohexyl methacrylate, 3,3'-diethoxypropyl methacrylate, 2-(diethylamino)ethyl methacrylate, di(ethylene glycol) methyl ether methacrylate, 2-ethoxyethyl methacrylate, ethylene glycol dicyclopentenyl ether methacrylate, ethylene glycol methyl ether methacrylate, 2-ethylhexyl methacrylate, ethyl methacrylate, furfuryl methacrylate, glycidyl methacrylate, hexyl methacrylate, 2-hydroxyethyl methacrylate, 2-isocyanatoethyl methacrylate, isodecyl methacrylate, lauryl methacrylate, methyl methacrylate, phenyl methacrylate, poly(propylene glycol) methacrylate, propyl methacrylate, tetrahydrofurfuryl methacrylate. The second monomeric or oligomeric component (B) may be di(ethylene glycol) methyl ether methacrylate.

The second monomeric or oligomeric component (B), wherein d is 2 may be selected from the group consisting of diethylene glycol diacrylate, polyethylene glycol diacrylate (mw: 200-500), 1,4-butanediol diacrylate, tripropylene glycol diacrylate, 1,3-butanediol diacrylate, 1,6-hexanediol diacrylate, tetraethylene glycol diacrylate, neopentyl glycol diacrylate, dipropylene glycol diacrylate, thiol diethylene glycol diacrylate, ethylene glycol dimethacrylate, poly(ethylene glycol) dimethacrylate (mw: less than 500) tetraethyleneglycol dimethacrylate, tetraethylene glycol dimethacrylate and poly(propylene glycol) dimethacrylate (having a molecular weight of less than 500 g/mol).

The photoinitiator may be selected from the group consisting of bis(2,4,6-trimethyl benzoyl)phenylphosphine oxide (IRGACURE 819), 2,4,6-trimethylbenzoyl diphenyl phosphine (TPO), 2-hydroxy-2-methyl-1-phenyl-1-propane (DAROCUR 1173) and benzophenone (BP). The photoinitiator may be bis(2,4,6-trimethyl benzoyl)phenylphosphine oxide (IRGACURE 819).

The resin composition may have a viscosity of between 1 to 3000 cps. The resin composition may have a viscosity of between 500 to 3000 cps, 1000 to 3000 cps, 1500 to 3000 cps, 1 to 2500 cps, 1 to 2000 cps, 1 to 1500 cps, 500 to 2500 cps, 1000 to 2000 cps, or 1300 to 1700 cps.

There is provided a method of preparing a polymer from the resin composition disclosed herein comprising the steps of (i) polymerizing the resin composition disclosed herein with light at room temperature using a 3D printer, and (ii) curing the polymer from step (i) with ultraviolet radiation.

In the polymerizing step (i), as a result of the functional groups in the first monomeric or oligomeric component (A) of the resin composition disclosed herein having a higher reactivity than the functional groups in the second monomeric or oligomeric component (B), the first monomeric or oligomeric component (A) polymerizes faster than the second monomeric or oligomeric component (B) upon exposure of the resin composition to light. This sequential polymerization process leads to the first monomeric or oligomeric component (A) building a hard and cross-linked three-dimensional network, while the second monomeric or oligomeric component (B) interpenetrates the abovementioned three-dimensional polymer network. The functional groups of the first monomeric or oligomeric component (A) are less sterically hindered and have a larger dipole moment than that of the second monomeric or oligomeric component (B), thus the functional groups in the first monomeric or oligomeric component (A) of the resin composition disclosed herein have a higher reactivity than that in the second monomeric or oligomeric component (B).

The reactivity is affected by the steric effect and polarity of the reactive group. In general, methyl acrylate reacts slower than the acrylate group because of the steric effect. In addition, the acrylate group with large dipole moment has faster polymerization than that with low dipole moment.

The polymerizing step (i) of the method of preparing a polymer from the resin composition disclosed herein is undertaken at a temperature in the range of about 20° C. to about 30° C. The polymerizing step (i) of the method of preparing a polymer from the resin composition disclosed herein is undertaken at a temperature in the range of about 20° C. to about 25° C., about 20° C. to about 27° C., about 20° C. to about 29° C., about 23° C. to about 30° C., about 23° C. to about 25° C., or about 25° C. to about 30° C.

There is provided a polymer obtainable by the method disclosed herein, wherein the polymer comprises a first polymer, resulting from polymerization of the first monomeric or oligomeric component (A) of the resin composition disclosed herein, and a second polymer, resulting from polymerization of the second monomeric or oligomeric component (B) of the resin composition disclosed herein, interpenetrated with the first polymer.

The polymer may exhibit a Young's modulus of between about 1.5 to about 5.0 GPa. The polymer may exhibit a Young's modulus of between about 2.0 to about 5.0 GPa, about 2.5 to about 5.0 GPa, about 1.5 to about 4.5 GPa, about 1.5 to about 4.0 GPa, about 1.5 to about 3.5 GPa, or about 2.0 to about 3.0 GPa.

The polymer may exhibit a flexure strength of between about 40 MPa to about 150 MPa. The polymer may exhibit a flexure strength of between about 40 MPa to about 120 MPa, about 40 MPa to about 90 MPa, about 60 MPa to about 120 MPa, about 80 MPa to about 120 MPa, about 60 MPa to about 120 MPa, or about 80 MPa to about 100 MPa.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a picture of a customized curing depth measuring reactor comprising a glass slide and a printed rectangle enclosure wall.

FIG. 2 shows an electronic photo mask array for curing depth studies with squares of dimension 2 millimeters by 2 millimeters.

FIG. 3 is a graph showing the cure depth comparison between a rigid resin (resin A) and a flexible resin (resin B) at various exposure times.

FIG. 4 is a Scanning Electron Microscope (SEM) image of the porous structure resulting from exposure of resin C to UV for 20 seconds at ×25,000 magnification.

EXAMPLES

Non-limiting examples of the invention and a comparative example will be further described in greater detail by reference to specific Examples, which should not be construed as in any way limiting the scope of the invention.

Materials and Methods

Unless otherwise stated, all processes were conducted at room temperature.

Materials

Chemicals were purchased from Merck Chemicals, Singapore and used without further purification.

Example 1: Resin Synthesis

Resin A Prepared from a First Monomeric Component (A)

A mixture of 10 g of bisphenol A dimethacrylate as first monomeric component (A) and 0.1 g of IRGACURE 819 as photoinitiator was added to a flask followed by 30 ml of tetrahydrofuran (THF). The resulting mixture was stirred at room temperature for 12 hours until a clear solution was obtained. THF was removed by evaporation and the resulting viscous liquid was vacuum dried at room temperature.

Resin B Prepared from a Second Monomeric Component (B)

10 g of di(ethylene glycol) methyl ether methacrylate as second monomeric component (B) was mixed with 0.1 g of the IRGACURE 819 as photoinitiator in a vial and stirred at room temperature for 12 hours until a clear solution was obtained.

Resin C Prepared from a Mixture of a First Monomeric Component (A) and a Second Monomeric Component (B)

A mixture of 5 g of bisphenol A dimethacrylate as first monomeric component (A) and 10 g of the di(ethylene glycol) methyl ether methacrylate as second monomeric component (B) in a vial was stirred for 1 hour until a clear solution was obtained. Then, 0.15 g of IRGACURE 819 as photoinitiator was added and the solution was stirred at room temperature overnight.

Resin D Prepared from a Mixture of a First Monomeric Component (A) and a Second Monomeric Component (B)

A mixture of 60 g of the bisphenol A dimethacrylate as first monomeric component (A) and 30 g of di(ethylene glycol) methyl ether methacrylate as second monomeric component (B) in a flask was stirred until a clear solution was obtained. 0.9 g of IRGACURE 819 as photoinitiator was then added and the mixture was stirred at room temperature overnight.

Example 2: Resin Characterization

Curing Depth Test 5 g of resin A or B, prepared as described in Example 1, was added to the curing depth measuring reactor as shown in FIG. 1 and placed on the tray of a LittleRP 3D printer obtained from Spatial Dynamics, Singapore. Resin A was left to stand at room temperature for a longer time of 2 hours before carrying out the following step due to its high viscosity. Resin B was used directly without standing as it has low viscosity.

An electronic photo mask array as shown in FIG. 2 was created by the opening slicing software from Creation Workshop, placed in the curing depth measuring reactor and the resin was cured with light over various time periods between 1 to 500 seconds. After curing, the remaining resin was decanted from the resulting solid structures, which were then washed with isopropanol. The solid structures were post-cured in a photo-reactor with a total power of 100 Watts for 10 minutes. The thickness of each square object was measured by calipers and the average thickness was used to plot against exposure time (FIG. 3). This procedure was repeated by changing the cure time and/or resin to obtain the cure depth of different cure time and different resins. FIG. 3 shows that the cure depth of resin A is greater than that of resin B for exposure times of between 0 to 500 seconds.

Morphology Analysis 1 g of resin C, prepared as described in Example 1, was added to a quartz cell and placed in an ultraviolet (UV) oven. After 20 seconds, the UV light was switched off and the quartz cell was washed with isopropanol until all remainder resin was removed from the solid structure. The solid was further cured under UV light for another 5 minutes. The sample was coated with around 10 nm of gold and analysed on a Zeiss Supra 40 VP scanning electron microscope (SEM).

FIG. 4 shows that the resulting solid has a porous structure, which indicates a different polymerization rate of resin A and B. As the rate of polymerization of resin A is faster than resin B, upon UV light exposure, resin A will polymerize first and form the resulting porous structures.

Mechanical Strength Test

Resins A, B and D, prepared as described in Example 1, were each printed on a LittleRP printer with 3 second exposure for each layer and 6 pieces of the tensile test sample bar of each resin were printed with a thickness of 2 mm. The printed tensile bars were removed from the printer platform and further cured in a UV oven for another 15 minutes.

The Young's modulus was determined using uniaxial tensile tests according to ISO 572-2. The tests were performed using an Instron 5584 universal testing machine, with a gauge length of 25 mm and a displacement rate of 1 mm min-1. A minimum of five samples were tested for each formulation.

The mechanical strength of the tensile bars was measured as described above. As indicated in the table below, the tensile bars prepared from resins A and B showed a Young's modulus of 3.2±0.25 GPa and 1.87±0.09 GPa respectively, the tensile bars prepared from resin C showed a Young's modulus of 3.5±0.43 GPa while the tensile bars prepared from resin D showed a Young's modulus of 4.2±0.12 GPa, which is higher than that of the individual component resins A or B and much higher than the market benchmark RenShape®SL 7820, which possesses a tensile modulus of 2.0 to 2.5 GPa.

|   | A | B | C | D |
|---|---|---|---|---|
| Young's Modulus (GPa) | 3.2 ± 0.25 | 1.87 ± 0.09 | 3.5 ± 0.43 | 4.2 ± 0.12 |

Flexure Strength Test

The flexure strength was tested on the universal tensile machine through three-point bending method. The specimens were prepared according to the standard of ASTM D790 with bar dimension of 63×12.7×3 mm. Maximum stress and strain are calculated on the incremental load applied.

As indicated in the table below, the tensile bars prepared from resins A, B, C and D showed flexure strength of 97±1.2 MPa, 49±0.6 MPa, 65±1.6 MPa and 107±0.9 MPa respectively.

|   | A | B | C | D |
|---|---|---|---|---|
| Flexure Strength (MPa) | 97 ± 1.2 | 49 ± 0.6 | 65 ± 1.6 | 107 ± 0.9 |

INDUSTRIAL APPLICABILITY

The present invention can be used to manufacture fluidic polymer resins for most lithography 3D printing techniques. This is applicable to industries such as automobile, aerospace, electronics and housing where the 3D printed polymer will replace traditional engineering materials such as wood or metal in many applications.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A resin composition comprising at least one first monomeric or oligomeric component (A), at least one second monomeric or oligomeric component (B) and a photoinitiator,
wherein
the first monomeric or oligomeric component (A) has a formula $[(A_1)\text{-}(A_2)_b]_a\text{-}[(A_3)]_e$, wherein
$A_1$ is independently selected from an acrylate moiety or a methacrylate moiety,
$A_2$ is independently selected from the group consisting of a linear alkyl, a linear alkoxy ether, and a linear poly(alkoxy ether) moiety, said linear alkyl, said linear alkoxy ether, or said linear poly(alkoxy ether) moiety being optionally substituted by at least one hydroxyl substituent,
a is an integer selected from at least 2,
b is an integer selected from 0 or at least 1,
e is an integer selected from at least 1, and
if a is 2, $A_3$ is selected from the group consisting of an aryl, a biaryl, a tricyclic alkyl, and a urethane moiety, or
if a is 3 or more, $A_3$ is selected from the group consisting of an alkoxy ether, a saturated heterocycle, or an alkyl moiety,
and the second monomeric or oligomeric component (B) has a formula $(B_1)_c\text{-}(B_2)_d$, wherein
$B_1$ is independently selected from an acrylate moiety or a methacrylate moiety,
$B_2$ is independently selected from the group consisting of an alkyl, an alkoxy ether, a thioalkyl, an aryl, an amino, and a poly(alkoxy ether) moiety,
c is an integer selected from 1 or 2, and
d is an integer selected from at least 1.

2. The resin composition of claim 1, wherein the first monomeric or oligomeric component (A) has a percentage composition by weight in the range of 10 wt % to 60 wt %, based on the weight of the resin composition.

3. The resin composition of claim 1, wherein the second monomeric or oligomeric component (B) has a percentage composition by weight in the range of 20 wt % to 80 wt %, based on the weight of the resin composition.

4. The resin composition of claim 1, wherein the photoinitiator has a percentage composition by weight in the range of 0.1 wt % to 10 wt %, based on the weight of the resin composition.

5. The resin composition of claim 1, wherein the first monomeric or oligomeric component (A) and the second monomeric or oligomeric component (B) each have an average molar mass of between 100 g/mol to 1200 g/mol.

6. The resin composition of claim 1, wherein the first monomeric or oligomeric component (A) is selected from the group consisting of bisphenol A dimethacrylate (bis-DMA), bisphenol A diglycidyl ether methacrylate (bis-GMA), ethoxylated bisphenol-A dimethacrylate (bis-EMA), tricyclo[5.2.1.02,6]decanedimethanol diacrylate, bisphenol A glycerolate diacrylate, bisphenol A ethoxylate diacrylate, bisphenol A ethoxylate dimethacrylate (oligomer), bisphenol F ethoxylate diacrylate (oligomer), hydroquinone diacrylate, naphthalene-1,5-diyl diacrylate, tricyclodecane dimethanol diacrylate, urethane acrylate (oligomer), branched hexa-functional aliphatic urethane acrylate, di(trimethylolpropane) tetraacrylate, pentaerythritol triacrylate, 1,3,5-triacryloylhexahydro-1,3,5-triazine, trimethylolpropane propoxylate triacrylate, trimethylolpropane triacrylate, and trimethylolpropane trimethacrylate.

7. The resin composition of claim 1, wherein the first monomeric or oligomeric component (A) is bisphenol A dimethacrylate.

8. The resin composition of claim 1, wherein the second monomeric or oligomeric component (B), wherein d is 1, is selected from the group consisting of ethyl acrylate, butyl acrylate, tert-butyl acrylate, ethyl 2-ethylacrylate, 2-(diethylamino)ethyl acrylate, 3-(dimethylamino) propyl acrylate, 2-carboxyethyl acrylate, 2-carboxyethyl acrylate oligomers, ethylene glycol methyl ether acrylate, ethyl 2-propylacrylate, hexyl acrylate, 4-hydroxybutyl acrylate, 2-hydroxyethyl acrylate, isodecyl acrylate, isooctyl acrylate, lauryl acrylate, methyl acrylate, methyl 3-hydroxy-2-methylenebutyrate, octadecyl acrylate, pentafluorophenyl acrylate, poly(propylene glycol) acrylate, tetrahydrofurfuryl acrylate, 2-tetrahydropyranyl acrylate, tert-butyl methacrylate, cyclohexyl methacrylate, 3,3'-diethoxypropyl methacrylate, 2-(diethylamino)ethyl methacrylate, di(ethylene glycol) methyl ether methacrylate, 2-ethoxyethyl methacrylate, ethylene glycol dicyclopentenyl ether methacrylate, ethylene glycol methyl ether methacrylate, 2-ethylhexyl methacrylate, ethyl methacrylate, furfuryl methacrylate, glycidyl methacrylate, hexyl methacrylate, 2-hydroxyethyl methacrylate, 2-isocyanatoethyl methacrylate, isodecyl methacrylate, lauryl methacrylate, methyl methacrylate, phenyl methacrylate, poly(propylene glycol) methacrylate, propyl methacrylate, and tetrahydrofurfuryl methacrylate.

9. The resin composition of claim 1, wherein the second monomeric or oligomeric component (B), wherein d is 2, is selected from the group consisting of diethylene glycol diacrylate, polyethylene glycol diacrylate, 1,4-butanediol diacrylate, tripropylene glycol diacrylate, 1,3-butanediol diacrylate, 1,6-hexanediol diacrylate, tetraethylene glycol diacrylate, neopentyl glycol diacrylate, dipropylene glycol diacrylate, thiol diethylene glycol diacrylate, ethylene glycol dimethacrylate, poly(ethylene glycol) dimethacrylate, tetraethyleneglycol dimethacrylate, tetraethylene glycol dimethacrylate, and poly(propylene glycol) dimethacrylate.

10. The resin composition of claim 1, wherein the second monomeric or oligomeric component (B) is di(ethylene glycol) methyl ether methacrylate.

11. The resin composition of claim 1, wherein the photoinitiator is selected from the group consisting of bis (2,4,6-trimethyl benzoyl)phenylphosphine oxide (IRGACURE 819), 2,4,6-trimethylbenzoyl diphenyl phosphine (TPO), 2-hydroxy-2-methyl-1-phenyl-1-propane (DAROCUR 1173), and benzophenone (BP).

12. The resin composition of claim 1, wherein the resin composition has a viscosity of between 1 cps to 3000 cps.

13. A method of preparing a polymer from the resin composition of claim 1 comprising the steps of (i) polymerizing the resin composition with light to form a polymer, and (ii) curing the polymer from step (i) with ultraviolet radiation.

14. The method of claim 13, wherein the polymerizing step (i) is undertaken at a temperature in a range of about 20° C. to about 30° C.

15. A polymer blend obtainable by step (i) polymerizing the resin composition of claim 1 with light to form a polymer, and (ii) curing the polymer from step (i) with ultraviolet radiation, wherein the polymer blend comprises a first polymer, resulting from polymerization of the first monomeric or oligomeric component (A) of the resin composition of claim 1, and a second polymer, resulting from polymerization of the second monomeric or oligomeric component (B) of the resin composition of claim 1, interpenetrated with the first polymer.

16. The polymer blend of claim 15, wherein the polymer blend exhibits a Young's modulus of 1.5 GPa to 5.0 GPa.

17. The polymer blend of claim 15, wherein the polymer blend exhibits a flexure strength of 40 MPa to 150 MPa.

18. A method of forming a 3-dimensional printed article, comprising the steps of (i) polymerizing a resin composition of claim 1 with light using a 3-dimensional printer to form a polymer, and (ii) curing the polymer from step (i) with ultraviolet radiation.

19. A kit comprising:
(i) at least one first monomeric or oligomeric component (A),
(ii) at least one second monomeric or oligomeric component (B), and
(iii) a photoinitiator,
wherein
the first monomeric or oligomeric component (A) has a formula $[(A_1)-(A_2)_b]_a-[(A_3)]_e$, wherein
$A_1$ is independently selected from an acrylate moiety or a methacrylate moiety,
$A_2$ is independently selected from the group consisting of a linear alkyl, a linear alkoxy ether and a linear poly(alkoxy ether) moiety, said linear alkyl, said linear alkoxy ether, or said linear poly(alkoxy ether) moiety being optionally substituted by at least one hydroxyl substituent,
a is an integer selected from at least 2,
b is an integer selected from 0 or at least 1,
e is an integer selected from at least 1, and
if a is 2, A3 is selected from the group consisting of an aryl, a biaryl, a tricyclic alkyl, and a urethane moiety, or
if a is 3 or more, A3 is selected from the group consisting of an alkoxy ether, a saturated heterocycle, or an alkyl moiety,
and the second monomeric or oligomeric component (B) has a formula $(B_1)_c-(B_2)_d$, wherein
$B_1$ is independently selected from an acrylate moiety or a methacrylate moiety,
$B_2$ is independently selected from the group consisting of an alkyl, an alkoxy ether, a thioalkyl, an aryl, an amino, and a poly(alkoxy ether) moiety,
c is an integer selected from 1 or 2, and
d is an integer selected from at least 1.

* * * * *

UNITED STATES PATENT AND TRADEMARK OFFICE
CERTIFICATE OF CORRECTION

PATENT NO. : 12,195,618 B2  
APPLICATION NO. : 17/802669  
DATED : January 14, 2025  
INVENTOR(S) : Fuke Wang et al.

Page 1 of 1

It is certified that error appears in the above-identified patent and that said Letters Patent is hereby corrected as shown below:

In the Claims

At Column 11, Line 46, Claim 1 "$[(A_1)-(A_2)_b]_a-[(A_3)]_e$" should be -- $[(A_1)-(A_2)_b]_a-[(A_3)]_e$ --.

At Column 11, Line 58, Claim 1 "As" should be -- $A_3$ --.

At Column 11, Line 65, Claim 1 "$(B_1)_c-(B_2)_d$" should be -- $(B_1)_c-(B_2)_d$ --.

At Column 14, Line 14, Claim 19 "$[(A_1)-(A_2)_b]_a-[(A_3)]_e$" should be -- $[(A_1)-(A_2)_b]_a-[(A_3)]_e$ --.

At Column 14, Line 26, Claim 19 "A3" should be -- $A_3$ --.

At Column 14, Line 29, Claim 19 "A3" should be -- $A_3$ --.

At Column 14, Line 33, Claim 19 "$(B_1)_c-(B_2)_d$" should be -- $(B_1)_c-(B_2)_d$ --.

Signed and Sealed this  
Twenty-fifth Day of March, 2025

Coke Morgan Stewart  
*Acting Director of the United States Patent and Trademark Office*